UNITED STATES PATENT OFFICE.

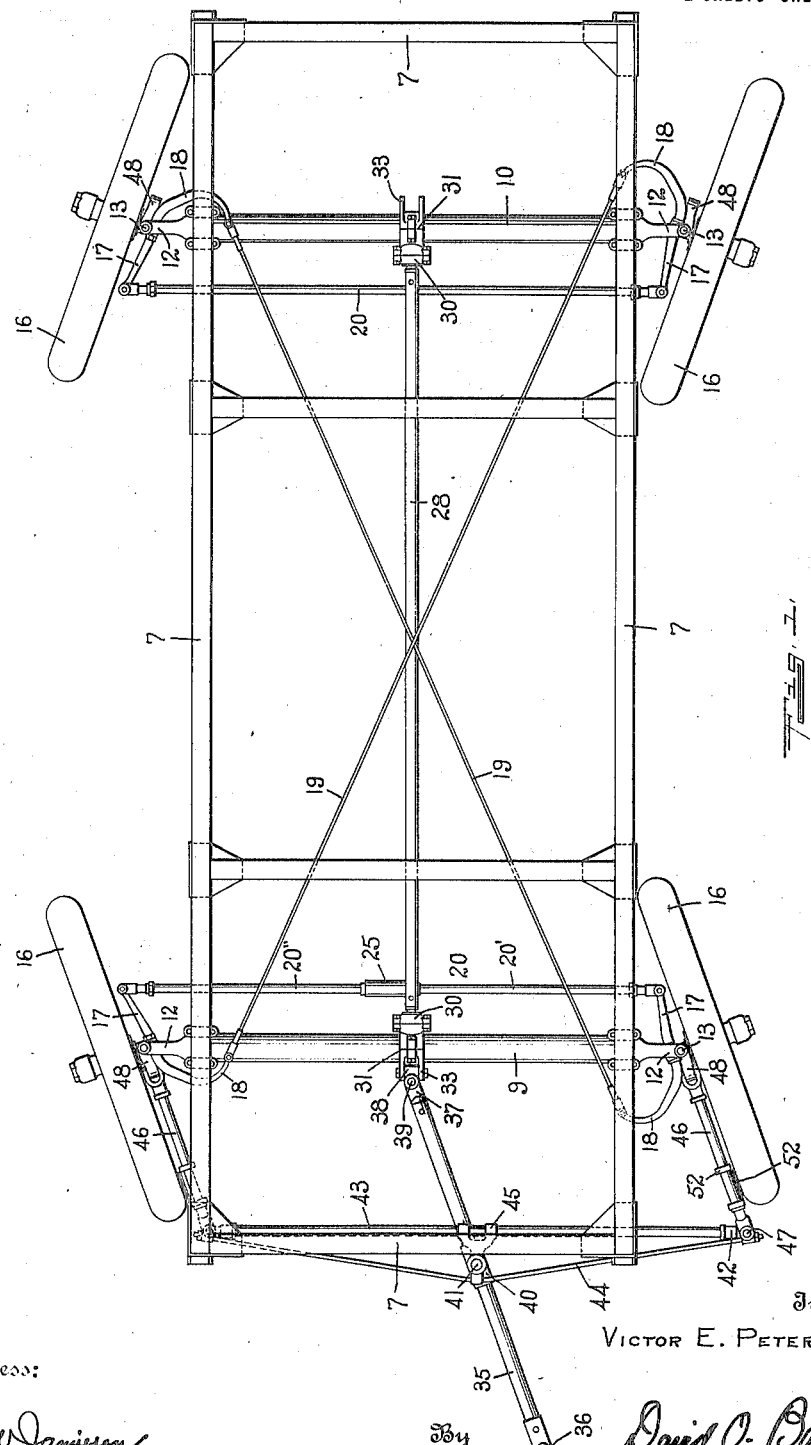

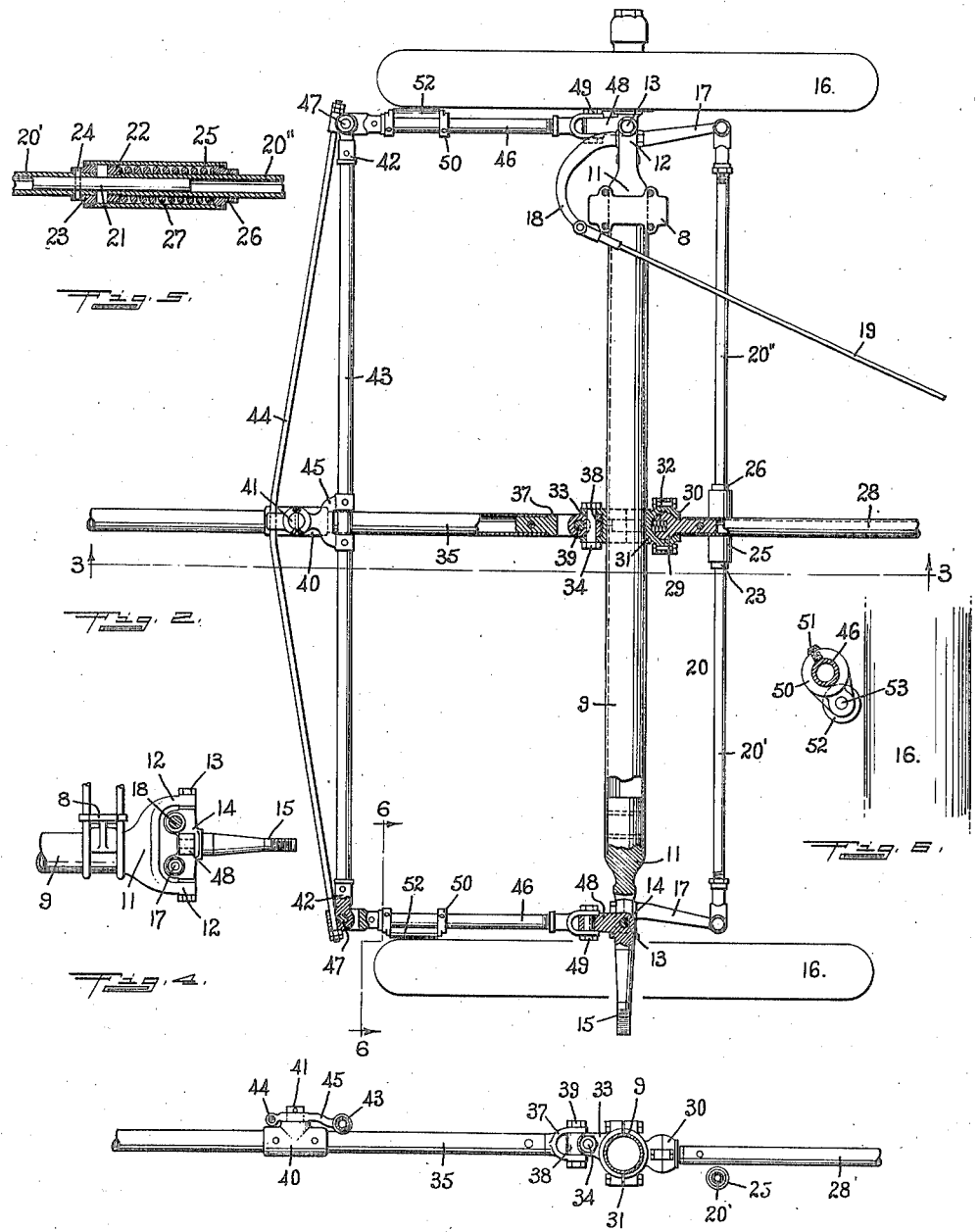

VICTOR E. PETERSON, OF OMAHA, NEBRASKA.

REVERSIBLE TRAILER AND STEERING MECHANISM.

1,303,591.   Specification of Letters Patent.   Patented May 13, 1919.

Application filed July 5, 1918. Serial No. 243,406.

*To all whom it may concern:*

Be it known that I, VICTOR E. PETERSON, a citizen of the United States, and a resident of Omaha, in the county of Douglas and State of Nebraska, have invented certain new and useful Improvements in Reversible Trailers and Steering Mechanism, of which the following is a specification.

My invention relates to trailer vehicles and steering mechanism therefor. It is the object of my invention to provide a trailer vehicle adapted to be drawn behind another vehicle, such as an automobile tractor or motor truck, and having draft and steering mechanism by which the trailer is automatically guided to follow the same path as the tractor. A further object of my invention is to provide a trailer vehicle in which the front and rear wheels are turned oppositely but equiangularly to the vehicle body, so as to follow the same path when turning corners. A further object of my invention is to provide a trailer vehicle in which the draft and steering devices may be applied interchangeably at either end thereof. A further object of my invention is to provide draft mechanism for a vehicle having its wheels mounted on steering knuckles, by which the tractive force is applied directly to the steering knuckles and not merely to the vehicle axle. Further and more particular objects of my invention will be set forth hereinafter.

In the accompanying drawings Figure 1 is a plan view of a vehicle embodying my invention, Fig. 2 is a detail plan view of the draft and steering devices, portions thereof being in horizontal section, Fig. 3 is a longitudinal vertical section on the line 3—3 of Fig. 2, Fig. 4 is a detail front view of one of the steering knuckles, Fig. 5 is a longitudinal section of the cross-rod compensator, and Fig. 6 is a detail transverse vertical section on the line 6—6 of Fig. 2.

In the structure represented in Fig. 1 there is a horizontal rectangular frame 7 adapted to support a vehicle body of any suitable and desired form. The body-frame 7 is preferably supported by springs which rest upon spring-seats 8 carried near the ends of axles 9 and 10. Said axles are preferably of tubular form and made of metal. The tubular axles are provided terminally with forked heads 11 having arms 12 spaced apart in a vertical plane, and bolts 13 are extended vertically through said arms to form pivotal axes for the steering knuckles. The latter have body portions 14 extending around the pivot-bolts 13, and integral horizontally extending spindles 15 on which the wheels 16 are revolubly mounted. Each of the knuckle-bodies has fixedly secured thereto an arm 17, the same extending rearwardly from the front axle or forwardly from the rear axle, as the case may be. The knuckle-bodies also have fixedly secured thereto curved arms 18, disposed oppositely to the arms 17 and curving inwardly around the ends of the spring-seats 8. The diagonally opposite pairs of the arms 18 are connected to each other by tension-rods 19, one of the latter extending from the right-side front arm to the left-side rear arm, and one extending from the left-side front arm to the right-side rear arm, as shown. Cross-rods 20 have the ends thereof pivotally connected with the ends of the front pair and the rear pair of the arms 17, said rods serving to keep the arms of the respective pairs in parallelism. The cross-connection between the front and rear knuckles, provided by the tension-rods 19, serves to cause the front and rear wheels to be turned equiangularly but in opposite direction relatively to the body-frame of the vehicle, whenever either pair of the wheels are turned from the normal or forward direction, by the draft and steering devices. Thus, in turning corners with the vehicles, the rear wheels will follow perfectly in the path of the front wheels and will not tend to follow a path of different radius from that of the front wheels, as in vehicles in which the rear wheels are on axes fixed relatively to the vehicle body. One of the cross-rods 20 is provided centrally with a compensating device of the structure shown in detail in Fig. 5, said device enabling slight variations in the length of said cross-rod, and maintaining a constant tension in the interconnected rod and lever system formed by the cross-rods, steering-knuckle-arms, and tension-rods 19. The cross-rod having the compensating device is tubular and divided into two parts 20′ and 20″ which are held in alinement with each other by means of a solid rod 21 secured to and projecting from the end of the part 20′ and fitting slidably within the part 20″. The part 20″ has a collar 22 secured on the end thereof, and the part 20′ has a collar 23 secured thereon by means of the cross-pin 24 employed for holding the alining-rod 21. The collar 23 carries a coaxial tubular sleeve 25 in which the collar 22 fits slidably, and the end of said sleeve is partially closed by an annular plug 26 which fits slidably upon the part 20″. A coil spring 27 is disposed about the part 20″ between the collar 22 and the annular plug 26, said spring being normally under a certain compression and tending to reduce the over-all length of the cross-rod.

The central portions of the axles 9 and 10 are connected to each other by a tubular metal reach or perch 28 which is provided at its ends with spherical heads 29 fitting into socket-pieces 30 secured to the axles by clamping-members 31. The ends of the heads 29 are counterbored to receive springs 32, as shown in Fig. 2, said springs preventing rattling and compensating for slight imperfections of fit of the parts. The ball-and-socket connections at the ends of the reach permit free play of the axles when the vehicle is passing over uneven surfaces, while maintaining a substantially rigid draft connection between the axles.

The portions of the axle-clamping members 31 opposite the socket-pieces 30 are provided with spaced vertically extending lugs 33 which have openings for receiving a horizontal pivot-bolt 34 employed for connecting the tongue or main draft-bar therewith. Said tongue or main draft-bar 35 is tubular and is provided at the front end with a suitable head 36, for detachable connection with the tractor. The rear end of the tongue has secured thereto a forked head 37 having portions which extend above and below a swivel-block 38 and are connected therewith by a vertically extending pivot-bolt 39, said block being held between the lugs 33 by the bolt 34. Intermediate the ends of the tongue 35 a sleeve 40 is secured thereon, said sleeve having a boss on the upper side thereof and a pin 41 extending vertically therefrom. To said pin 41 there is pivotally connected a horizontally and transversely extending truss comprising end-members 42, a compression member 43, a tension member 44, and a central strut 45, the latter having an opening to receive the pin 41. Side draft-bars 46 have the front ends thereof connected with the truss end-members 42 by vertically extending pivot-bolts 47, and the rear ends of said bars 46 are connected with lugs 48 formed integrally with the bodies 14 of the steering-knuckles, the connection being formed by horizontol pivot-bolts 49. The transverse distance between the pivot-bolts 47 is the same as that between the knuckle pivot-bolts 13, and the distance between the bolts 13 and 47 is the same as that between the pin 41 and bolt 39, so that when the tongue 35 is swung laterally the side draft-bars 46 are maintained in parallelism therewith, and the truss remains parallel with the axle. The draft-bars and tongue may also be swung in vertical planes about the axes of the horizontal pivot-bolts 49 and 34. Near the front end of each of the draft-bars 46, a pair of collars 50 are adjustably secured thereon by means of set-screws 51. The collars of each pair are spaced longitudinally of the respective draft-bar and have laterally extending lugs between which a roller 52 is journaled on a pin 53 which passes through the lugs and roller parallel with the draft-bar. The rollers 52 are normally positioned adjacent to but not in contact with the inner sides of the tires of the vehicle wheels 16, as shown in Fig. 6, but by rotation of the collars 50 about the draft-bars the rollers may be moved toward or away from the wheels, the collars being retained in adjusted position by the set-screws 51. The rollers 52 serve to prevent rubbing of the wheel-tires against the draft-bars, should the mechanism be distorted by abnormal stresses tending to reduce the normal clearance between the tires and the draft-bars.

The operation of the mechanism will be apparent from the foregoing. When the head 36 of the tongue 35 is connected with a suitable tractor, the trailer vehicle may be drawn and guided thereby so as to follow in substantially the identical path of the tractor, regardless as to whether or not the latter is moving straight ahead or in a curved path. The draft and steering mechanism may be readily applied to either end of the trailer vehicle by merely removing the horizontal pivot-bolts 34 and 49 from one end of the trailer and employing the same to connect the mechanism with the other end thereof, and the operation of the mechanism will be substantially the same when applied at either end of the trailer. By means of the transversely extending truss and the side draft-bars, the tractive force is applied directly to the steering knuckles as well as to the center of the axle, and the draft from the latter is transmitted by the reach directly to the rear axle.

Now, having described my invention, what I claim and desire to secure by Letters Patent is:

1. The combination with a trailer vehicle having wheels mounted on horizontally swingable steering knuckles, of a main draft-bar, a transverse rigid member connected therewith, side draft-bars pivotally connected with the ends of said transverse member, and means connecting said side draft-bars directly with the steering knuckles.

2. In a trailer vehicle having front and rear wheels mounted on steering knuckles and means interconnecting said steering knuckles to coördinate movements thereof, a pair of draft-bars, means connecting said draft-bars directly with a transversely alined pair of the steering knuckles, a transverse member pivotally connected with the forward ends of said draft-bars and adapted to maintain parallelism thereof, and a main draft-bar connected centrally with said transverse member and adapted to swing the same laterally in accordance with deviations in the line of draft thereof.

3. In a trailer vehicle having a relatively fixed axle with horizontally swingable steering knuckles at the ends thereof, draft-bars connected with said steering knuckles and extending forwardly therefrom respectively and swingable therewith, a member pivotally connected with the front ends of said draft-bars and adapted to maintain parallelism thereof, and means for applying tractive force to said member and moving the same laterally in accordance with deviations in the line of draft.

4. Draft and steering mechanism for a trailer vehicle having steering knuckles pivoted at the ends of a relatively fixed axle, comprising a tongue pivotally connected with the central portion of the axle, side draft-bars connected with the steering knuckles and extending forwardly therefrom, and a rigid transverse member extending parallel with the axle and pivotally connected with the tongue and the side draft-bars to maintain parallelism thereof.

5. In a vehicle of the described class, fixed front and rear terminally forked axles, steering knuckles swingably mounted in the axle forks on vertical axes, a pair of arms on each knuckle, tension-rods connecting like arms of the diagonally opposite knuckles, cross-rods connecting the other arms of the transversely opposite knuckles, an extensible compensating device disposed intermediate the ends of one of said cross-rods, and means on each knuckle adapted for direct connection with draft and steering devices.

6. In a vehicle of the described class, steering knuckles, side draft-bars pivoted thereto on horizontal axes so as to be swingable vertically but immovable laterally relatively to said steering knuckles, a transverse member connecting the ends of said draft-bars and pivoted thereto on vertical axes spaced similarly to the axes of the steering knuckles, a tongue pivotally connected with said transverse member on a vertical axis, and means pivotally connecting the tongue with the vehicle axle intermediate the steering knuckles, said pivotal connecting means having both horizontal and vertical axes to enable movement of the tongue both laterally and vertically.

VICTOR E. PETERSON.